(12) United States Patent
Chen

(10) Patent No.: US 11,750,616 B2
(45) Date of Patent: Sep. 5, 2023

(54) METHOD FOR AUTHORIZING APPROVAL PROCESSES AND APPROVAL NODES THEREOF FOR USER

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

(*) Notice: Subject to any disclaimer, the term of this patent is extended or adjusted under 35 U.S.C. 154(b) by 304 days.

(21) Appl. No.: 16/635,137

(22) PCT Filed: Aug. 9, 2018

(86) PCT No.: PCT/CN2018/099768
§ 371 (c)(1),
(2) Date: Jan. 29, 2020

(87) PCT Pub. No.: WO2019/029649
PCT Pub. Date: Feb. 4, 2019

(65) Prior Publication Data
US 2020/0382512 A1   Dec. 3, 2020

(30) Foreign Application Priority Data
Aug. 10, 2017   (CN) .......................... 201710682787.8

(51) Int. Cl.
*H04L 9/40*   (2022.01)
*G06F 21/62*   (2013.01)
(Continued)

(52) U.S. Cl.
CPC ........ *H04L 63/102* (2013.01); *G06F 21/6218* (2013.01); *G06Q 10/06311* (2013.01); *G06Q 10/105* (2013.01); *H04L 63/105* (2013.01)

(58) Field of Classification Search
CPC . H04L 63/102; H04L 63/105; G06F 21/6218; G06Q 10/06311; G06Q 10/105
See application file for complete search history.

(56) References Cited

U.S. PATENT DOCUMENTS 6,226,624 B1    5/2001   Watson
6,662,199 B1   12/2003   Flight
(Continued)

FOREIGN PATENT DOCUMENTS

AU      2016100635      6/2016
CN      101951377 A     1/2011
(Continued)

OTHER PUBLICATIONS

International Search Report in the international application No. PCT/CN2018/099768, dated Sep. 27, 2018.
(Continued)

*Primary Examiner* — Jason Chiang
(74) *Attorney, Agent, or Firm* — Ladas & Parry, LLP

(57) ABSTRACT

A method for authorizing an approval process and approval node thereof for a user is provided. The method for authorizing an approval process a user comprises: selecting a user in a system; displaying all approval processes in the system, and displaying current usage permission states of the selected user with respect to the approval processes; and authorizing usage permissions of the approval processes to the selected user. All of the approval processes or all approval nodes in the system are displayed after the user is selected, without omitting any approval process or any approval node, thereby facilitating quick authorization of related permissions to the user.

10 Claims, 5 Drawing Sheets

| User | Form | Approval process | Usage Permission | Last authorization operator and authorization time |
|---|---|---|---|---|
| ☑Role1 | Contract | Approval process 1 | ☑ | User A, June 1, 2017 |
| ☐Role2 | | Approval process 2 | ☐ | User A, June 1, 2017 |
| ☐Role3 | | Approval process 3 | ☐ | User A, June 1, 2017 |
| | Customer | Approval process 1 | ☑ | User A, June 1, 2017 |
| ...... | ...... | ...... | ...... | ...... |

(51) Int. Cl.
  *G06Q 10/0631* (2023.01)
  *G06Q 10/105* (2023.01)

(56) References Cited

U.S. PATENT DOCUMENTS

| | | | | |
|---|---|---|---|---|
| 6,789,252 B1* | 9/2004 | Burke | G06F 8/10 | 717/103 |
| 6,871,071 B2 | 3/2005 | Takao | | |
| 7,035,825 B1* | 4/2006 | Sturtevant | G06Q 30/02 | 705/51 |
| 7,117,165 B1* | 10/2006 | Adams | G06Q 20/102 | 705/40 |
| 7,904,817 B2* | 3/2011 | Bergantino | G05B 19/0426 | 715/740 |
| 8,214,398 B1 | 7/2012 | Cowan | | |
| 8,291,490 B1 | 10/2012 | Ahmed | | |
| 8,510,264 B1* | 8/2013 | Tamm | G06F 16/256 | 707/608 |
| 8,548,940 B1* | 10/2013 | Rajaram | G06F 16/2308 | 707/684 |
| 8,738,414 B1* | 5/2014 | Nagar | G06Q 10/103 | 705/7.12 |
| 8,949,855 B2* | 2/2015 | Bettin | G06F 9/541 | 705/26.81 |
| 9,652,739 B2 | 5/2017 | Siegal | | |
| 11,036,520 B1* | 6/2021 | Wilczek | G06N 20/20 | |
| 11,363,026 B2 | 6/2022 | Chen | | |
| 2002/0026592 A1 | 2/2002 | Gavrila | | |
| 2002/0157004 A1 | 10/2002 | Smith | | |
| 2003/0189600 A1* | 10/2003 | Gune | G06Q 10/10 | 715/810 |
| 2004/0003353 A1* | 1/2004 | Rivera | G06Q 10/10 | 715/255 |
| 2004/0019512 A1* | 1/2004 | Nonaka | G06Q 10/06316 | 705/7.26 |
| 2004/0083367 A1 | 4/2004 | Garg | | |
| 2006/0090208 A1 | 4/2006 | Smith | | |
| 2006/0095413 A1* | 5/2006 | Moffat | G06F 16/284 | |
| 2006/0218394 A1 | 9/2006 | Yang | | |
| 2006/0259486 A1* | 11/2006 | Lind | G06Q 10/06 | 707/999.009 |
| 2006/0282350 A1* | 12/2006 | Lind | G06Q 10/0875 | 705/29 |
| 2007/0016514 A1 | 1/2007 | Al-Abdulqader | | |
| 2008/0022370 A1 | 1/2008 | Beedubail | | |
| 2009/0106757 A1* | 4/2009 | Kawajiri | G06Q 10/06 | 718/100 |
| 2009/0182607 A1* | 7/2009 | Morinville | G06Q 10/063112 | 705/7.14 |
| 2009/0199155 A1* | 8/2009 | Morris | G06Q 10/06 | 717/102 |
| 2009/0204471 A1* | 8/2009 | Elenbaas | G06Q 10/06 | 726/28 |
| 2009/0282006 A1* | 11/2009 | Misvaer | G06Q 10/06 | |
| 2009/0319544 A1* | 12/2009 | Griffin | G06F 16/25 | |
| 2010/0011001 A1 | 1/2010 | Holmes | | |
| 2010/0125670 A1 | 5/2010 | Dondeti | | |
| 2010/0223570 A1* | 9/2010 | Gerstl | G06Q 10/06 | 715/772 |
| 2010/0324953 A1 | 12/2010 | Janssen | | |
| 2011/0231481 A1* | 9/2011 | Calahan | H04L 67/02 | 709/203 |
| 2011/0258683 A1* | 10/2011 | Cicchitto | G06F 21/604 | 726/4 |
| 2011/0321154 A1* | 12/2011 | Dau | G06F 21/6218 | 726/17 |
| 2012/0030223 A1* | 2/2012 | Stein | G06F 9/4843 | 707/756 |
| 2012/0054100 A1 | 3/2012 | Pfohl | | |
| 2012/0203588 A1 | 8/2012 | Burri | | |
| 2012/0310699 A1* | 12/2012 | McKenna | G06Q 10/00 | 705/7.26 |
| 2013/0024472 A1* | 1/2013 | Stein | G06Q 10/10 | 707/769 |
| 2013/0046583 A1* | 2/2013 | Kanhed | G06Q 10/0637 | 705/7.36 |
| 2013/0124568 A1 | 5/2013 | Wang | | |
| 2013/0159034 A1* | 6/2013 | Herter | G06Q 10/06 | 705/7.11 |
| 2013/0159063 A1* | 6/2013 | Fessler | G06Q 10/0631 | 705/7.36 |
| 2013/0246106 A1* | 9/2013 | Kroetsch | G06Q 10/06 | 705/7.12 |
| 2013/0311191 A1 | 11/2013 | Deng | | |
| 2013/0311559 A1* | 11/2013 | Swinson | G06Q 50/01 | 709/204 |
| 2014/0025425 A1 | 1/2014 | Chalana | | |
| 2014/0025571 A1 | 1/2014 | Dooley | | |
| 2014/0040314 A1* | 2/2014 | Ebrahimi | G06F 16/25 | 707/783 |
| 2014/0075492 A1 | 3/2014 | Kapadia | | |
| 2014/0082689 A1* | 3/2014 | Christiaens | G06F 21/604 | 726/1 |
| 2014/0122333 A1* | 5/2014 | Whipple | G06F 3/0482 | 705/44 |
| 2014/0129273 A1 | 5/2014 | Versteeg | | |
| 2014/0157370 A1 | 6/2014 | Plattner | | |
| 2014/0173755 A1 | 6/2014 | Wahl | | |
| 2014/0207675 A1* | 7/2014 | Rosendahl | G06Q 20/3223 | 705/44 |
| 2014/0282261 A1* | 9/2014 | Ranz | G06F 3/0482 | 715/838 |
| 2014/0365350 A1 | 12/2014 | Shvarts | | |
| 2015/0026075 A1* | 1/2015 | Mondri | G06F 16/27 | 705/304 |
| 2015/0134827 A1 | 5/2015 | Shah | | |
| 2015/0156065 A1* | 6/2015 | Grandhe | H04L 41/5019 | 709/224 |
| 2015/0334119 A1 | 11/2015 | Schmitt | | |
| 2016/0004868 A1* | 1/2016 | Robke | G06F 21/6218 | 726/25 |
| 2016/0098682 A1* | 4/2016 | Tsyganskiy | G06Q 10/0633 | 705/320 |
| 2016/0140464 A1* | 5/2016 | Tomoeda | G06Q 10/06 | 705/7.17 |
| 2016/0232294 A1 | 8/2016 | Nuggehalli | | |
| 2017/0139845 A1 | 5/2017 | Bhati et al. | | |
| 2017/0236084 A1* | 8/2017 | Sullivan | H04L 67/10 | 705/7.26 |
| 2017/0270596 A1* | 9/2017 | Nagalkar | G06Q 30/0637 | |
| 2017/0277900 A1 | 9/2017 | Tong | | |
| 2017/0316159 A1* | 11/2017 | Hooker | G16H 10/60 | |
| 2017/0329506 A1* | 11/2017 | Laetham | G06F 3/0482 | |
| 2018/0074674 A1* | 3/2018 | Alabes | G06Q 10/101 | |
| 2018/0359264 A1 | 12/2018 | Sweet | | |
| 2020/0076818 A1 | 3/2020 | Krishnan | | |
| 2020/0134527 A1 | 4/2020 | Chen | | |
| 2020/0145424 A1 | 5/2020 | Chen | | |
| 2020/0202023 A1* | 6/2020 | Chen | G06F 21/6209 | |
| 2020/0202301 A1 | 6/2020 | Chen | | |
| 2020/0382512 A1* | 12/2020 | Chen | G06Q 10/063112 | |

FOREIGN PATENT DOCUMENTS

| | | |
|---|---|---|
| CN | 102468971 | 5/2012 |
| CN | 102468971 A | 5/2012 |
| CN | 103310315 A | 9/2013 |
| CN | 103455888 | 12/2013 |
| CN | 103577411 A | 2/2014 |
| CN | 104216912 A | 12/2014 |
| CN | 104346663 | 2/2015 |
| CN | 104346663 A | 2/2015 |
| CN | 104408339 | 3/2015 |
| CN | 104599078 A | 5/2015 |
| CN | 105005730 | 10/2015 |
| CN | 105046446 | 11/2015 |
| CN | 106022734 A | 10/2016 |
| CN | 106127026 A | 11/2016 |
| CN | 106485388 A | 3/2017 |
| CN | 106503969 A | 3/2017 |
| CN | 106529761 | 3/2017 |

(56) References Cited

FOREIGN PATENT DOCUMENTS

| | | |
|---|---|---|
| CN | 106713340 A | 5/2017 |
| CN | 106779594 A | 5/2017 |
| CN | 107180334 | 9/2017 |
| CN | 107357882 | 11/2017 |
| CN | 107392499 A | 11/2017 |
| JP | 2009-251809 A | 10/2009 |

OTHER PUBLICATIONS

Written Opinion of the International Searching Authority in the international application No. PCT/CN2018/099768, dated Sep. 27, 2018 with English translation provided by Google Translate.

First Office Action and Search Report from Chinese Patent Application No. 201810398996.4, dated Apr. 27, 2020, with English translation from Global Dossier, all pages.

Second Office Action from Chinese Patent Application No. 201810398996.4, dated Jan. 6, 2021, with English translation from Global Dossier, all pages.

Decision of Rejection from CN app. No. 201810398996.4, dated May 14, 2021, with English translation generated by Google Translate, all pages.

Notice of Allowance from Chinese Patent Application No. 201810746943.7 dated Jul. 1, 2021, and its English translation from Global Dossier.

Office action and Search Report from Chinese Patent Application No. 201810746943.7 dated Jul. 2, 2020, and its English translation from Global Dossier.

Notice of Allowance from U.S. Appl. No. 16/609,444 (now U.S. Pat. No. 11,363,026) dated Apr. 29, 2022.

Office Action from U.S. Appl. No. 16/609,444 (now U.S. Pat. No. 11,363,026) dated Sep. 16, 2021.

Office Action from U.S. Appl. No. 16/629,298 dated Feb. 28, 2022.

International Search Report for PCT/CN2018/085162 dated Jul. 2, 2018 and its English translation provided by WIPO.

Written Opinion of the International Search Authority PCT/CN2018/085162 dated Jul. 2, 2018 and its English translation provided by Google Translate.

International Preliminary Report (Chapter II) for PCT/CN2018/085162 dated Apr. 11, 2019 and its English translation provided by WIPO.

International Search Report in the international application No. PCT/CN2018/095052, dated Sep. 29, 2018.

International Preliminary Report on Patentability (Chapter I) from PCT/CN2018/095052 dated Jan. 14, 2020, and its English translation from WIPO.

Rychkova, Irina, and Selmin Nurcan. "Modeling the role variability in the MAP process model." In 2011 Fifth International Conference on Research Challenges in Information Science, pp. 1-9. IEEE, 2011.

Weidong, Zhao, Dai Weihui, and Wu Liang. "Role-driven Business Process Models." In 2006 IEEE International Conference on Systems, Man and Cybernetics, vol. 6, pp. 4850-4854. IEEE, 2006.

Notice of Allowance from Chinese Patent Application No. 201810904670.4 dated Mar. 18, 2021.

Office Action from Chinese Patent Application No. 201810904670.4 dated Dec. 18, 2020.

Office Action from Chinese Patent Application No. 201810904670.4 dated May 7, 2020 with search report.

\* cited by examiner

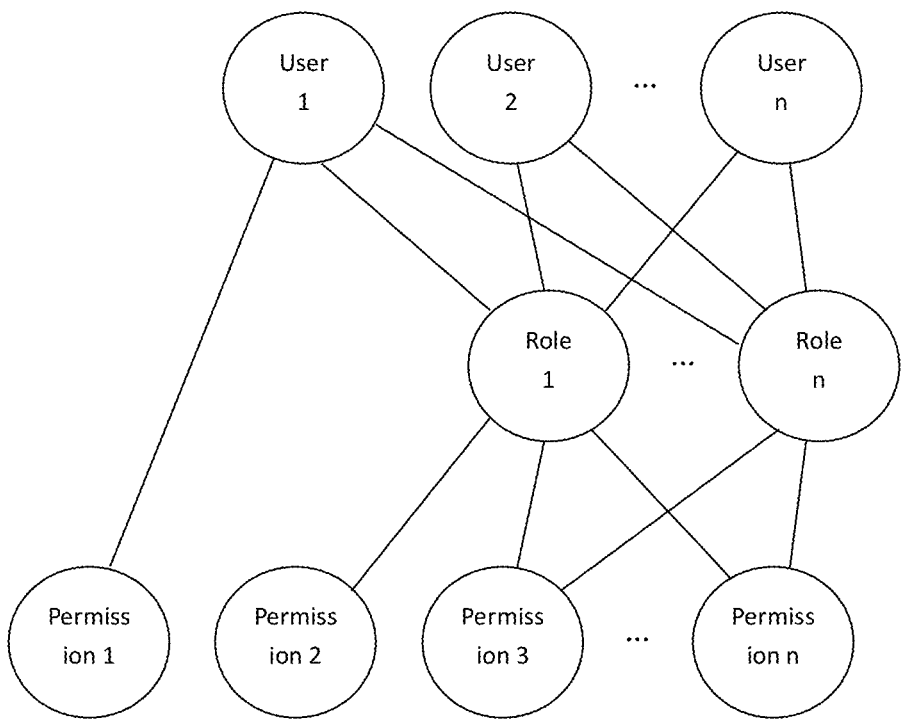
FIG. 3
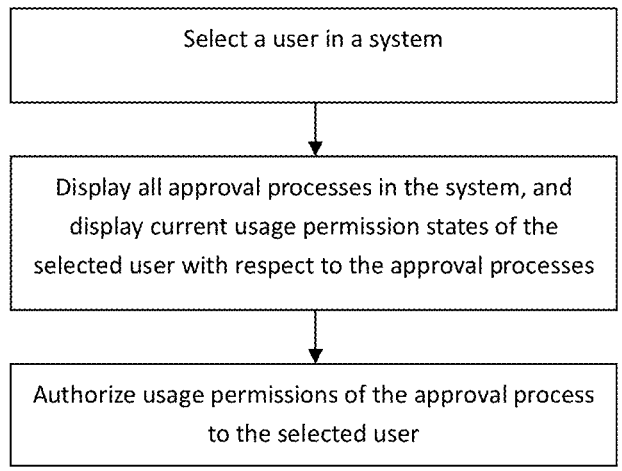
FIG. 4
| User | Form | Approval process | Usage Permission | Last authorization operator and authorization time |
|---|---|---|---|---|
| ☑Role1<br>☐Role2<br>☐Role3<br>...... | Contract | Approval process 1 | ☑ | User A, June 1, 2017 |
| | | Approval process 2 | ☐ | User A, June 1, 2017 |
| | | Approval process 3 | ☐ | User A, June 1, 2017 |
| | Customer | Approval process 1 | ☑ | User A, June 1, 2017 |
| | ...... | ...... | ...... | ...... |
FIG. 5

| User | Form | Approval process | Approval node | UsagePermission | Last authorization operator and authorization time |
|---|---|---|---|---|---|
| ☑Role1 ☐Role2 ☐Role3 …… | Contract | Approval process 1 | Approval node 1 | ☑ | User A, June 1, 2017 |
| | | | Approval node 2 | ☑ | User A, June 1, 2017 |
| | | Approval process 2 | Approval node 1 | ☐ | User A, June 1, 2017 |
| | | | Approval node 2 | ☐ | User A, June 1, 2017 |
| | | | Approval node 3 | ☐ | User A, June 1, 2017 |
| | | Approval process 3 | Approval node 1 | ☐ | User A, June 1, 2017 |
| | Customer | Approval process 1 | Approval node 1 | ☑ | User A, June 1, 2017 |
| | | | Approval node 2 | ☐ | User A, June 1, 2017 |
| …… | …… | …… | …… | …… | …… |

FIG. 8

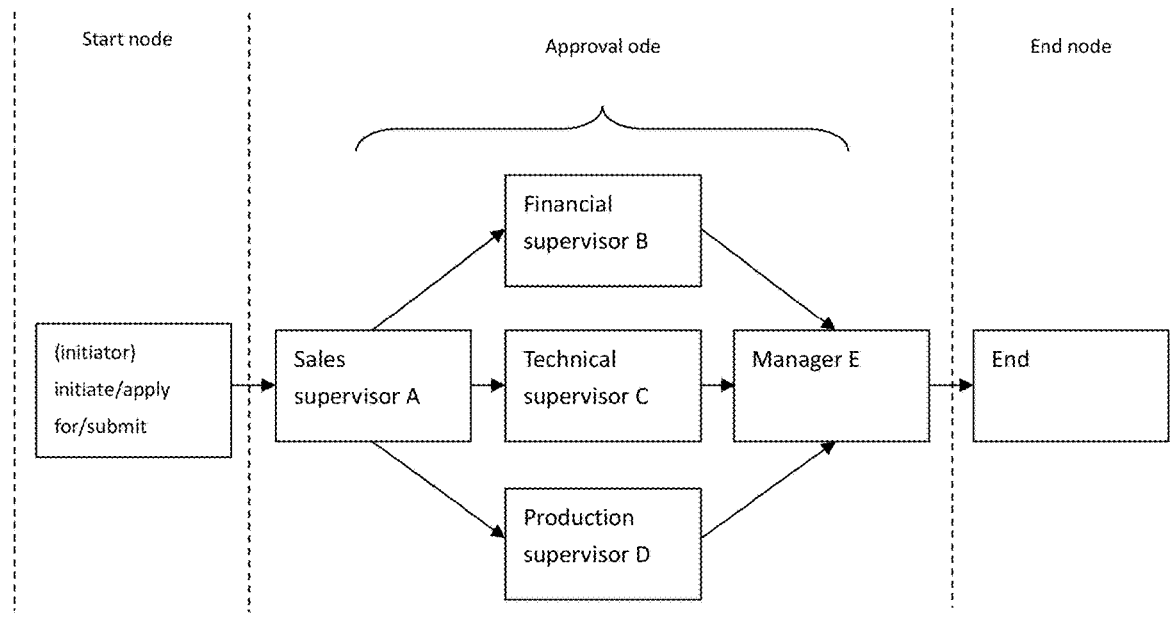

FIG. 9

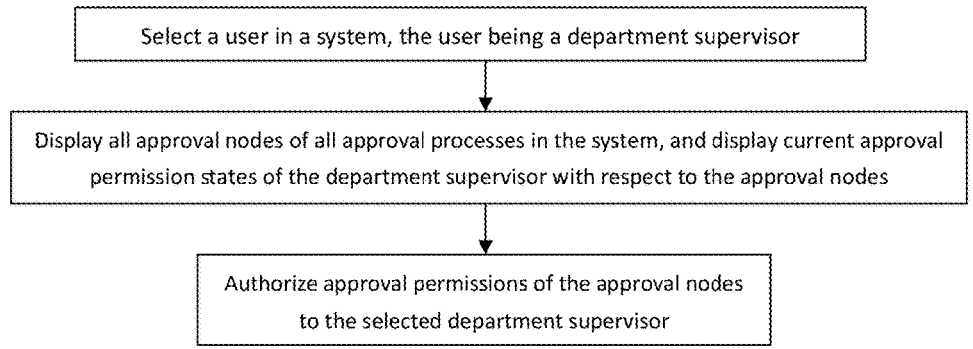

FIG. 10

| Department supervisor | Form | Approval process | Approval node | Usage Permission | Last authorization operator and authorization time |
|---|---|---|---|---|---|
| ☑ supervisor of a sales department<br>☐ supervisor of a production department<br>☐ supervisor of an administrative department<br>…… | Contract | Approval process 1 | Approval node 1 | ☑ | User A, June 1, 2017 |
| | | | Approval node 2 | ☑ | User A, June 1, 2017 |
| | | Approval process 2 | Approval node 1 | ☐ | User A, June 1, 2017 |
| | | | Approval node 2 | ☐ | User A, June 1, 2017 |
| | | | Approval node 3 | ☐ | User A, June 1, 2017 |
| | | Approval process 3 | Approval node 1 | ☐ | User A, June 1, 2017 |
| | Customer | Approval process 1 | Approval node 1 | ☑ | User A, June 1, 2017 |
| | | | Approval node 2 | ☐ | User A, June 1, 2017 |
| | …… | …… | …… | …… | …… |

FIG.11

METHOD FOR AUTHORIZING APPROVAL PROCESSES AND APPROVAL NODES THEREOF FOR USER

CROSS-REFERENCE TO RELATED APPLICATIONS

This application is the U.S. national phase of PCT/CN2018/099768 filed on Aug. 9, 2018, which claims priority to Chinese Application No. 201710682787.8 filed on Aug. 10, 2017, the disclosures of which are incorporated by reference herein in their entireties.

BACKGROUND

Technical Field

The present invention relates to a method for authorizing an approval process and an approval node thereof for a user.

Related Art

Role-based access control (RBAC) is one of the most researched and matured permission management mechanisms for database permissions in recent years. It is considered to be an ideal candidate to replace conventional mandatory access control (MAC) and discretionary access control (DAC). The basic idea of role-based access control (RBAC) is to divide different roles according to different functional positions in an enterprise organization view, encapsulate an access permission of database resources in roles, and allow users to indirectly access the database resources by being assigning different roles to the users.

A large number of tables and views are often built in large-scale application systems, which makes the management and permissions of database resources very complicated. It is very difficult for the user to directly manage the access and permissions of the database resources. It requires the user to have a very thorough understanding of the database structure and to be familiar with the use of the SQL language, Once the structures or security requirements of the application systems have changed, a large number of complex and cumbersome permission changes are required, and the security vulnerabilities caused by some unexpected authorization errors are very likely to occur. Therefore, designing a simple and efficient permission management method designed for large-scale application systems has become a common requirement for system and system users.

The role-based permission control mechanism can manage the access permissions of the system simply and efficiently, which greatly reduces the burden and cost of the system permission management, and makes the system permission management more compliant with the business management specifications of the application system.

However, the conventional role-based user permission management method adopts a "role-to-user one-to-many" relation mechanism, where the "role" is a group or class nature, that is, one role can simultaneously correspond to/be relate to multiple users. The role is similar to a post/position/type of work or other concepts, the permission authorized to a user under this relation mechanism is basically divided into the following three forms: 1, as shown in FIG. 1, the permissions are directly authorized to the user, where the disadvantage is that the workload is large, the operation is frequent and troublesome; 2. As shown in FIG. 2, the role (having the nature of a class/group/post/type of work) is authorized (a role can be related to multiple users), and the user obtains the permission through its role; 3. As shown in FIG. 3, the above two methods are combined.

In the above descriptions, as both 2 and 3 need to authorize the role having the nature of a class/group, and the way of authorization through the role in the nature of class/group/post/type of work has the following disadvantages: 1. when the user's permissions change, the operation is difficult: in the actual process of using a system, it is often necessary to adjust the user's permissions during the operation process. For example, when the employee's permission changes, the authority of an employee related to the role changes, we can't change the permissions of the entire role because of the change in the individual employee's permissions, because this role is also related to other employees whose permissions remain unchanged. So to cope with this situation, either create a new role to satisfy the employee whose permissions have changed, or directly authorize (disengaged from the role) from the employee based on the permission requirements. The above two processing methods not only require a long time for the role authorization in the case of a large number of role permissions, but also are easy to make mistakes, the user is cumbersome and troublesome to operate, and errors occur easily resulting in loss to the system user.

2. It is difficult to remember the specific permissions contained in a role for a long time: if the role has many permission function points, it will be difficult to remember the specific permissions of the role, and it is even more difficult to remember the differences in permissions of roles with similar permissions. If a new user needs to be associated, it is impracticable to accurately determine how to select a role for relation.

3. Because user permissions change, more roles will be created (if you do not create a new role, it will greatly increase the authorization directly to the user), and it is more difficult to distinguish the specific differences between permissions of the roles.

4. When a user is transferred from a post, if many permissions of the transferred user need to be assigned to other users, separating the permissions of the transferred users and creating roles to relate to other users respectively are necessary. Such operations are not only complicated and time-consuming, but also prone to errors In an existing management software system such as ERP, after a user of a system is added, a usage permission of an approval process (for example, an approval process that is used when form data of a form is submitted for approval) is required to be authorized for the added user and/or a usage permission of an approval node is required to be authorized. An existing method for authorizing the usage permission of the approval process is as follows: an approval process to be authorized is found first, and then the user is added to users of the approval process, so that the user has the usage permission of the process. Because the added user may have usage permissions of a plurality of approval processes, use of a method for authorizing the usage permissions of the approval processes one by one may cause a huge amount of workload and easily cause an authorization error. In the prior art, a method for authorizing the usage permission of the approval process is below: an approval process that an approval node to-be-authorized belongs to is found first, and then the approval node to-be-authorized is found from the approval process, added users are added to approvers of the approval nodes to-be-authorized, respectively. The authorization is more complex than authorization of the approval process, and when numerous approval nodes need to be authorized, a huge amount of authorization workload is caused, and an authorization error easily occurs.

During company operation, a usage permission of approval process and/or a usage permission of an approval node for a user is required to be adjusted greatly due to various reasons, which needs a huge amount of workload. In addition, when the approval process and the approval node are authorized in the existing software system such as ERP, authorization of usage permissions of approval processes and authorization of approval nodes need to be performed one by one. In the authorization method, current usage permission states of all approval processes or approval nodes in the system for the user cannot be displayed at a time, impeding re-authorization of the permissions of the user and easily causing the authorization error.

SUMMARY

Technical Problem

The present invention aims to overcome the defect of the prior art and provides a method for authorizing an approval process and an approval node thereof for a user, and all approval processes or all approval nodes in a system are displayed after the user is selected, without omitting any approval process or any approval node, facilitating quick authorization of related permissions to the user.

Solutions to Problem

Technical Solution

An object of the present invention is achieved by the following technical solutions: a method for authorizing an approval process for a user comprises: selecting a user in a system; displaying all approval processes in the system, and displaying current usage permission states of the selected user with respect to the approval processes; and authorizing a usage permission of the approval process to the selected user.

Preferably, if two or more approval processes belong to the same form, only the usage permission of one approval process can be authorized to one user (that is, one user can only be granted with the usage permission of one approval process of the same form).

Preferably, said user includes a role, a user, an employee, and a group/class, one or more types thereof, said role is an independent individual not a group/class, and during the same period, one role can only be related to a unique user, while one user is related to one or more roles; and the user obtains permissions of the related role.

Preferably, after one user is selected, an authorization operator that most recently authorizes usage permissions of the approval processes to the selected user and an authorization time thereof are displayed, respectively.

A method for authorizing an approval node for a user comprises: selecting a user in a system; displaying all approval nodes of all approval processes in the system, and displaying current approval permission states of the selected user with respect to the approval nodes; and authorizing an approval permission of the approval node to the selected user.

Preferably, the method for authorizing an approval node for a user further comprises: authorizing the selected user to view and/or modification permissions of a form field/field value of a form corresponding to an approval process in which the approval node is located.

Preferably, said user includes a role, a user, an employee, and a group/class, one or more types thereof, said role is an independent individual not a group/class, and during the same period, one role can only be related to a unique user, while one user is related to one or more roles; and the user obtains permissions of the related role.

Preferably, when the user is transferred from a post, the user's relation to the original role is canceled, and the user is related to a new role.

A method for authorizing an approval node for a user comprises: selecting a user in a system, said user being a department supervisor; displaying all approval nodes of all approval processes in the system, and displaying current approval permission states of the department supervisor with respect to the approval nodes; and authorizing an approval permission of the approval node to the department supervisor.

Preferably, the method for authorizing an approval node for a user further comprising: authorizing the selected department supervisor to view and/or modification permissions of a form field/field value of a form corresponding to an approval process in which the approval node is located.

Preferably, said user/department supervisor includes one or more types of a role, a user, and an employee, said role is an independent individual not a group/class, and during the same period, one role can only be related to a unique user, while one user is related to one or more roles; and the user obtains permissions of the related role.

Preferably, a corresponding supervisor role/user/employee is set for the department supervisor.

Preferably, all approval processes with the usage permissions and all approval nodes with approval permissions of the user in the system are displayed, the usage permissions/approval permissions of the approval processes/approval nodes are modified, and one or more approval processes that the user does not have a usage permission/approval node that the user does not have an approval permission are selected as required to be set with the usage permission/approval permission.

Preferably, "displaying all approval nodes of all approval processes in the system" is "displaying all approval nodes of all approval processes that are viewable by the operator in the system".

Preferably, "displaying all approval processes in the system" is "displaying all approval processes that are viewable by the operator in the system".

Preferably, an approval process and/or an approval node that a user has a permission of is displayed in a different manner: for example, the approval process and/or the approval node that the user has the permission of is displayed in the front, or the approval process and/or the approval node that the user has the permission of is highlighted, or the approval process and/or the approval node that the user has the permission of is displayed in a different color/logo, etc.

Beneficial Effects of Invention

Beneficial Effects

Beneficial effects of the present invention are described as follows: (1) all of the approval processes or approval nodes in the system are displayed after the user is selected, without omitting any approval process or any approval node, thereby facilitating quick authorization of related permissions for the user.

(2) When all of the approval processes or approval nodes in the system are displayed, current usage permission states of the selected user with respect to the approval processes or current approval permission states of the selected user with respect to the approval nodes are displayed, so that the authorization operator makes a modification based on this, achieving quick authorization of the approval processes for the user or quick authorization of the approval nodes for the user, improving authorization efficiency and reducing an authorization error rate (in addition, the current usage permission states of the user with respect to the approval processes or the current approval permission states of the user with respect to the approval nodes is easily known, and one-time display may promote thorough understanding thereof since one-by-one view is very troublesome and lacks integrity/comprehensiveness).

(3) After a user is selected, the authorization operator that mostly recently authorizes the usage permissions of the approval processes or the approval permissions of the approval nodes for the user and an authorization time are displayed, respectively, facilitating claiming of a responsibility in case of a user permission error and determining whether the user needs to be authorized.

(4) The approval permissions of the approval nodes may be authorized for the department supervisor, because the department supervisor is dynamically corresponding to a related role, a user, or an employee, and when a supervisor role, a supervisor user, and a supervisor employee of a department are changed, the department supervisor may also be automatically corresponding to a new supervisor role, supervisor user, and supervisor employee, without re-authorization of the approval permissions of related approval nodes for the new supervisor role, supervisor user, and supervisor employee, reducing authorization workload.

(5) The conventional permission management mechanism defines the role as the nature of a group, a type of work, a class or the like. The role is in a one-to-many relation to the user. In the actual process of using a system, the user's permissions often need to be adjusted during the operation process. For example, in processing the change of an employee's permissions, when the permissions of the employee related to the role have changed, it is improper to change the permissions of the entire role due to the change in the permissions of the individual employee, because this role is also related to other employees whose permissions remain unchanged. To cope with this situation, either a new role is created to fit the employee whose permissions have changed, or permissions are directly authorized to the employee (disengaged from the role) based on permission requirements. The above two processing methods not only take a long time but also cause mistakes easily during the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method of the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (the permissions of the user/role have changed dynamically), the solutions in the present application can significantly improve the permission management efficiency for the system user when using the system, make the dynamic authorization simpler, more convenient, clearer and more explicit, and improve the efficiency and reliability of the permission setting.

(6) The conventional role authorization method with the nature of a group is prone to errors. The method provided in the present application significantly reduces the probability of authorization errors, because the method of the present application only needs to consider the role as an independent individual, without considering the commonalities of multiple users related to the role having the nature of a group under the conventional method. Even if the authorization errors occur, only the user related to the role is affected. However, in the case of the conventional role having the nature of a group, all users related to the role will be affected. Even if the authorization errors occur, the correction method of the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

(7) In the conventional group-based role authorization method, if the role has many permission function points, as time goes by, it is difficult to remember the specific permissions of the role, and it is even more difficult to remember the permission of roles with similar permissions. If a new user needs to be related, it cannot be accurately determined how to select a relation. In the method of the present application, the role itself has the nature of a post number/a work station number, such that the selection can be made easily.

(8) When a user is transferred from a post, if many permissions of the transferred user need to be assigned to other users, in processing, it is necessary to distinguish the permissions of the transferred user and then create roles to be related to other users respectively. The operations are complicated, time-consuming, and prone to errors.

The method of the present application is as follows: The transferred user is related to several roles. When the user is transferred, the relation of the user to the roles in the original department is first canceled (the canceled roles may be re-related to other users), and then the user is related to a role in a new department. The operation is simple and not error-prone.

(9) A department needs to be selected when or after a role is created. After the role belongs to the department, the department cannot be replaced. Reasons why the department to which the role belongs cannot be replaced are as follows: Reason 1: As the role in the present application is equivalent to a work station number/a post number in nature, different station numbers/post numbers have different work content/permissions. For example, the role of a salesperson 1 under a sales department and the role of a developer 1 under a technical department are two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

BRIEF DESCRIPTION OF THE DRAWINGS

Brief Description of the Drawings

Figure 1:
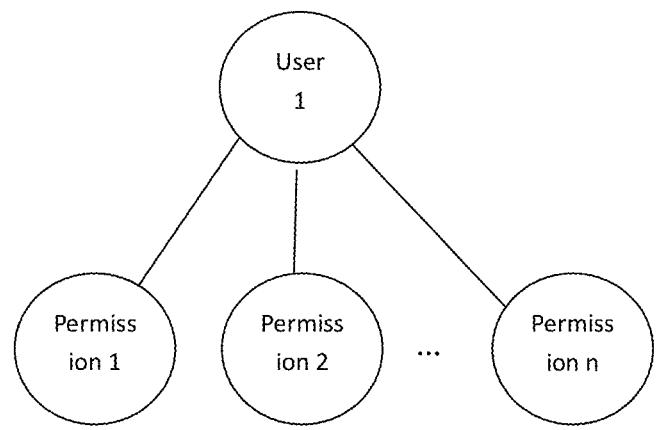
Figure 2:
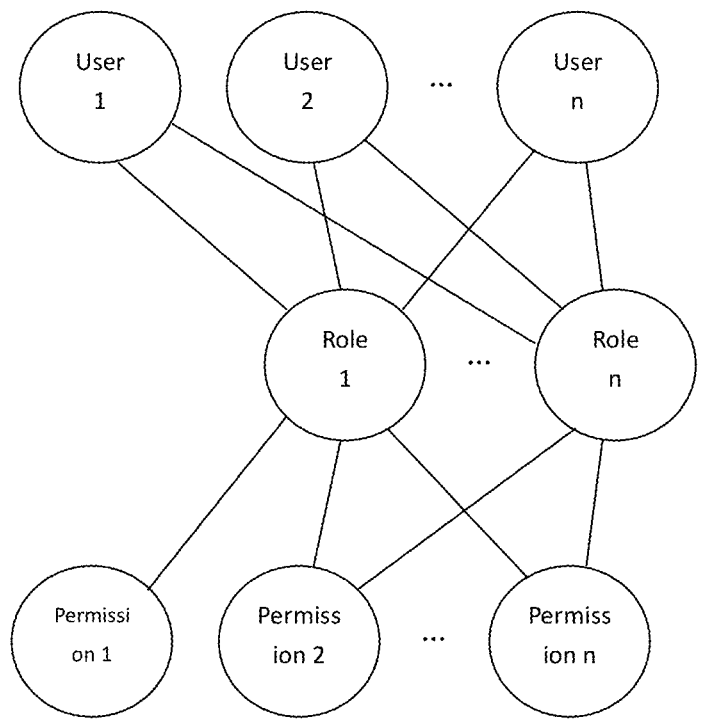
Figure 6:
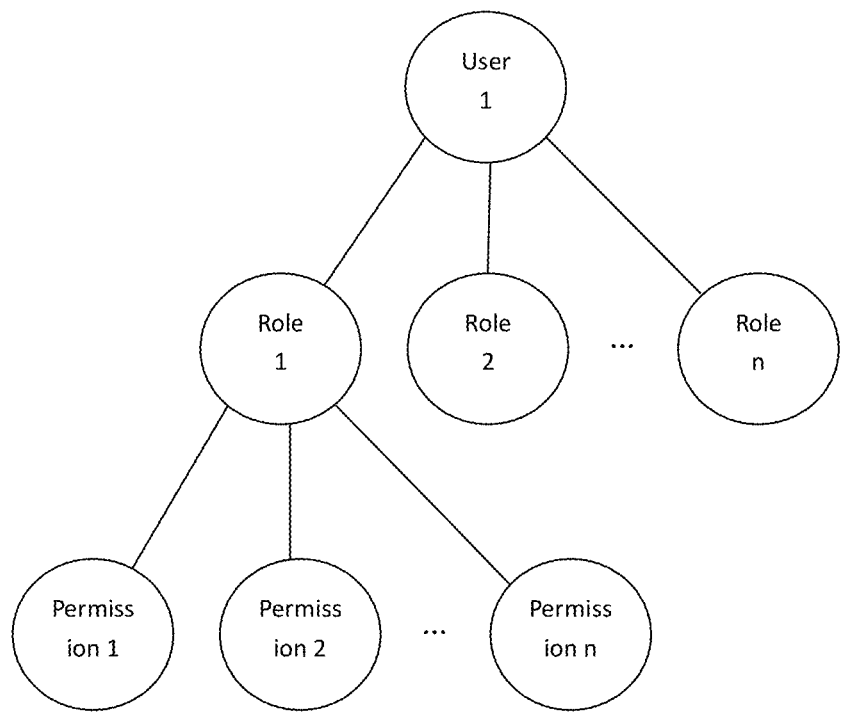
Figure 7:
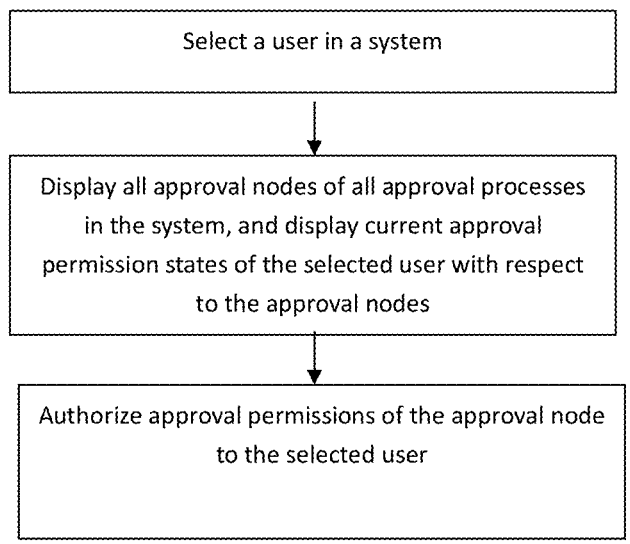

FIG. 1 is a schematic diagram of a way of directly authorizing a user by a system in the Background Art;

FIG. 2 is a schematic diagram of a way of authorizing a group/class property role by the system in the Background Art;

FIG. 3 is a schematic diagram of a way of directly authorizing the user in combination with authorization of the group/class property role by the system in the Background Art;

FIG. 4 is a flow chart of a method for authorizing an approval process for a user according to the present invention;

FIG. 5 is a schematic diagram of authorizing an approval process for a user according to the present invention;

FIG. 6 is a schematic diagram of a way of authorizing a user through an independent individual property role by a system according to the present invention;

FIG. 7 is a flow chart of a method for authorizing an approval node for a user according to the present invention;

FIG. 8 is a schematic diagram of authorizing an approval node for a user according to the present invention;

FIG. 9 is a schematic diagram of an approval process;

FIG. 10 is another flow chart of a method for authorizing an approval node for a user according to the present invention; and FIG. 11 is still another schematic diagram of authorizing an approval node for a user according to the present invention.

DETAILED DESCRIPTION

Detailed Description

The following describes technical solutions of the present invention in further detail with reference to accompanying drawings, but the protection scope of the present invention is not limited to the following.

[Embodiment 1] As shown in FIG. 4, a method for authorizing an approval process for a user comprises: S11: selecting a user in a system.

For example, a role 1 in FIG. 5 is selected as the user.

The user includes one or more of roles, the user, an employee, and a group/class.

As shown in FIG. 6, the role is an independent individual not a group/class, during the same period, one role can only be related to a unique user, while one user is related to one or more roles. The user obtains permissions of the related role. When or after the role is created, a department is selected for the role, so that the role belongs to the department. The role is authorized according to its work content, the name of the role is unique in the department, and the number of the role is unique in the system.

Definition of a role: A role does not have the nature of a group/class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/class/a post/a position/a type of work in nature, and one role can correspond to multiple users. However, in the present application, the concept of "role" is equivalent to a post number/a work station number, and is also similar to the role in a film and television drama: one role (in childhood, juvenile, middle-age . . . ) can be played by only one actor or actress during the same period, but one actor or actress may play multiple roles.

When the user is transferred from a post, the user's relation to the original role is canceled, and the user is related to a new role. The user loses the permissions of the original role and obtains the permissions of the new role automatically.

When the employee is recruited, after the role is related to the user corresponding to the employee, the user automatically obtains the permissions of the related role. When the employee resigns, after the relation between the user corresponding to the employee and the role related to the user is canceled, the user automatically loses the permissions of the original related role.

After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and the employee determines (obtains) permissions through the role related to the corresponding user.

Further, the employee and the user are bound permanently. After the user corresponds to the employee, the user belongs to the employee, and the user can no longer be related to other employees. If the employee resigns, the user cannot correspond to other employees. After the employee is recruited again, the employee still uses the original user.

S12: displaying all approval processes in the system, and displaying current usage permission states of the selected user with respect to the approval processes.

For example, in FIG. 5, after a role 1 is selected, all approval processes in the system are displayed. The approval process includes an approval process 1 of a contract form, an approval process 2 of the contract form, an approval process 3 of the contract form, and an approval process 1 of a customer form, etc. The role 1 currently has usage permissions of the approval process 1 of the contract form and the approval process 1 of the customer form.

S13: authorizing usage permissions of the approval processes to the selected user. (The usage permission is which approval process is used when form data of a form is submitted for approval). When two or more approval processes belong to the same form, only the usage permission of one approval process is authorized only to one user (the form representing a service object, such as an order, a contract, or a customer, etc., each piece of form data corresponding to one unique service object, for example, customer 001 in the customer form representing one unique customer 001, and the customer 001 being one piece of form data/one object).

For example, in FIG. 5, the approval process 1 of the contract form, the approval process 2 of the contract form, and the approval process 3 of the contract form belong to the contract form. The role 1 currently has only the usage permission of the approval process 1 of the contract form.

After a user is selected, an authorization operator that authorizes usage permissions of the approval processes to the selected user and authorization time thereof are displayed, respectively, to facilitate determination whether the user needs to perform authorization of the usage permissions of the approval processes. For example, an authorization operator needs to authorize usage permissions of approval processes for 100 roles, but the authorization operator only completes authorization of usage permissions of approval processes for 70 roles. When the authorization operator continues authorizing usage permissions of approval processes for roles next day, a role to be authorized of a usage permission of an approval process is searched for through selection of an authorization operator that most recently authorizes a usage permission of an approval process for a role or authorization time during which the usage permission of the approval process is most recently authorized for the role. For another example, it may be known, through viewing an authorization time during which usage permissions of approval processes are most recently authorized for a role, that how long usage permissions of the approval processes for the role are not changed, facilitating determination whether the usage permissions of the approval processes need to be authorized for the role again.

For example, in FIG. 5, an authorization operator that most recently authorizes, for role 1, usage permissions of the approval process 1 of the contract form, the approval process 2 of the contract form, the approval process 3 of the contract form, and the approval process 1 of the customer form is user A, and the authorization time is Jun. 1, 2017.

Further, all approval processes with usage permissions of the user in the system are displayed, usage permissions of the approval processes are modified, and one or more approval processes that the user does not have a usage permission of are selected as required to be set with the usage permission.

Further, "displaying all approval processes in the system" is "displaying all approval processes that are viewable by the operator in the system".

Further, an approval process that a user has a permission of is displayed in a different manner: for example, the approval process that the user has the permission of is displayed in the front, or the approval process that the user has the permission of is highlighted, or the approval process that the user has the permission of is displayed in a different color/logo, etc.

[Embodiment 2] As shown in FIG. 7, a method for authorizing an approval node for a user comprises: S21: selecting a user in a system.

For example, a role 1 in FIG. 8 is selected as the user.

The user includes one or more of roles, the user, an employee, and a group/class.

As shown in FIG. 6, the role is an independent individual not a group/class, during the same period, one role can only be related to a unique user, while one user is related to one or more roles. The user obtains permissions of the related role. When or after the role is created, a department is selected for the role, so that the role belongs to the department. The role is authorized according to its work content, the name of the role is unique in the department, and the number of the role is unique in the system.

When the user is transferred from a post, the user's relation to the original role is canceled, and the user is related to a new role. The user loses the permissions of the original role and obtains the permissions of the new role automatically.

When the employee is recruited, after the role is related to the user corresponding to the employee, the user automatically obtains the permissions of the related role. When the employee resigns, after the relation between the user corresponding to the employee and the role related to the user is canceled, the user automatically loses the permissions of the original related role.

After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and the employee determines (obtains) permissions through the role related to the corresponding user Further, the employee and the user are bound permanently. After the user corresponds to the employee, the user belongs to the employee, and the user can no longer be related to other employees. If the employee resigns, the user cannot correspond to other employees. After the employee is recruited again, the employee still uses the original user.

S22: displaying all approval nodes of all approval processes in the system, and displaying current approval permission states of the selected user with respect to the approval nodes.

For example, in FIG. 8, after a role 1 is selected, all approval nodes of all approval processes in the system are displayed. All approval nodes include an approval node 1 and an approval node 2 of an approval process 1 of a contract form, an approval node 1, an approval node 2, and an approval node 3 of an approval process 2 of the contract form, an approval node 1 of an approval process 3 of the contract form, and an approval node 1 and an approval node 2 of an approval process 1 of a customer form, etc. The role 1 currently has approval permissions for the approval node 1 and the approval node 2 of the approval process 1 of the contract form and the approval node 1 of the approval process 1 of the customer form.

The approval process includes a start node, an approval node, and an end node. There may be one or more approval nodes in one approval process. An approver of an approval node approves a to-be-approved task.

FIG. 9 is an approval process before a sales contract is signed. The process includes a start node, an approval node, and an end node. The start node includes an initiator configured to initiate/apply for/submit the approval process of the sales contract. The approval nodes (for example, 5 approval nodes in FIG. 9) include a sales supervisor A, a financial supervisor B, a technical supervisor C, a production supervisor D, and a manager E. The sales supervisor A is responsible for all information approval of the sales contract, the financial supervisor B is responsible for financial approval of the sales contract, the technical supervisor C is responsible for technical approval of the sales contract, the production supervisor D is responsible for production approval of the sales contract, and the manager E is responsible for all information approval of the sales contract except customer information.

S23: authorizing approval permissions of the approval nodes to the selected user, that is, the user is selected/set as an approver of a corresponding approval node.

A method for authorizing an approval node for a user further comprises: view and/or modification permissions of a form field/field value of a form corresponding to an approval process in which the approval node is located are authorized to the selected user (that is, which fields/field values may be viewed and or modified when the approver/selected user is authorized to perform an approval at the approval node). After the user is set as an approver of one approval node, the approver performs a corresponding operation based on authorization thereof for "the form field/field value" at the approval node.

After one user is selected, an authorization operator that most recently authorizes an approval permission of the approval node of the approval process to the selected user and authorization time thereof are displayed, respectively.

For example, in FIG. 8, an authorization operator that recently authorizes, to the role 1, approval permissions of the approval node 1 and approval node 2 of the approval process 1 of the contract form and the approval node 1 of the approval process 1 of the customer form, and the authorization time is Jun. 1, 2017.

Further, all approval nodes with approval permissions for the user in the system are displayed, the approval permissions of the approval nodes are modified, and one or more approval nodes that the user does not have an approval permission of are selected as required to be set with the approval permission.

Further, "displaying all approval nodes of all approval processes in the system" is "displaying all approval nodes of all approval processes that are viewable by the operator in the system".

Further, an approval process and/or an approval node that a user has a permission of is displayed in a different manner: for example, the approval process and/or the approval node that the user has the permission of is displayed in the front, or the approval process and/or the approval node that the user has the permission of is highlighted, or the approval process and/or the approval node that the user has the permission of is displayed in a different color/logo, etc.

[Embodiment 3] As shown in FIG. 10, a method for authorizing an approval node for a user comprises: S31: selecting a user in a system, the user being a department supervisor.

For example, in FIG. 11, a supervisor of a sales department is selected as the user.

The department supervisor is currently a supervisor employee/supervisor user/supervisor role (or a user related to the role supervisor or an employee corresponding to the user related to supervisor role) of a department. The supervisor employee/supervisor user/supervisor role is set in a method below: one employee/user is selected as the supervisor employee/supervisor user of one or more departments, or a role that does not belong to a department is selected as the supervisor role of a department, or a role that belongs to a department is selected as the supervisor role of the department that the role belongs to. When the supervisor employee/supervisor user/supervisor role of the department is changed, the department supervisor is a new supervisor employee/supervisor user/supervisor role (that is, a current supervisor).

For example, if the supervisor role of a sales department is a salesman 1, a department supervisor of the sales department is the salesman 1. If the supervisor role of the sales department is changed to be a salesman 2, the department supervisor of the sales department is the salesman 2.

S32: displaying all approval nodes of all approval processes in the system, and displaying current approval permission states of the department supervisor with respect to the approval nodes.

The approval process includes a start node, an approval node, and an end node. There may be one or more approval nodes in one approval process.

For example, in FIG. 11, after a supervisor of a sales department sales is selected, all approval nodes of all approval processes in the system are displayed. All approval nodes include an approval node 1 and an approval node 2 of an approval process 1 of a contract form, an approval node 1, an approval node 2, and an approval node 3 of an approval process 2 of the contract form, an approval node 1 of an approval process 3 of the contract form, and an approval node 1 and an approval node 2 of an approval process 1 of the customer form, etc. The supervisor of the sales department currently has approval permissions of the approval node 1 and the approval node 2 of the approval process 1 of the contract form and the approval node 1 of the approval process 1 of the customer form.

S33: authorizing approval permissions of the approval nodes to the selected department supervisor.

The method for authorizing an approval node for a user further comprises: authorizing, to the selected department supervisor, view and/or modification permissions of a form field/field value of a form corresponding to a process in which the approval node is located. After the department supervisor is set as an approver of one approval node, the approver performs a corresponding operation based on authorization of "the form field/field value" at the approval node.

After one department supervisor is selected, an authorization operator that most recently authorizes an approval permission of the approval node of the approval process for the selected department supervisor and an authorization time thereof are displayed, respectively.

For example, in FIG. 11, the authorization operator that most recently authorizes, to the supervisor of the sales department, the approval permissions of the approval node 1 and the approval node 2 of the approval process 1 of the contract form, and the approval node 1 of the approval process 1 of the customer form is user A, and the authorization time is Jun. 1, 2017.

The above is only a preferred embodiment of the present invention. It should be understood that the present invention is not limited to the forms disclosed herein, and is not to be construed as the exclusion to the other embodiments, but may be used in various other combinations, modifications and environments. Modifications can be made according to the techniques or knowledge of the above teachings or related art within conceptive scope herein. All changes and modifications made by those skilled in the art are intended to be within the scope of the appended claims.

What is claimed is:

1. A method for directly managing access and usage permissions of a form for a role in a Role-Based Access Control (RBAC) computer management system, comprising:

selecting the role in the management system;
searching by the system all approval processes for one or more forms to be approved, each of the one or more forms being identified with a form name, while the one or more forms are in an unopened state, generating a single user interface and displaying current usage permission states of the selected role with respect to each of the approval processes of the one or more forms to be approved, wherein all usage permissions associated with each of the approval processes are displayed, and the usage permissions are selectable with respect to the selected role, the current usage permission states being configured as selected or unselected; and granting or updating by an authorization operator through the single user interface a usage permission of one or more of the approval processes to the selected role;

wherein said selected role is independent which is not a group or class, and during a same period, one role is configured to be related to a user only, while the user is configured to be related to the one role or more roles, the user is configured to obtain the usage permission of the related one role or more roles.

2. The method according to claim 1, wherein if two or more approval processes belong to a same form, only the usage permission of one approval process can be authorized to the selected role.

3. The method according to claim 1, wherein the user comprises an employee.

4. The method according to claim 1, wherein after one role is selected, an authorization operator that has last authorized the usage permission of the one or more of the approval processes to the selected role and an authorization time are displayed, respectively.

5. A method for directly managing access and usage permissions of a form for a role in a Role-Based Access Control (RBAC) computer management system, comprising:

selecting the role in the management system;

searching by the system all approval nodes associated with all approval processes in the management system for one or more forms to be approved, each of the one or more forms being identified with a form name, while the one or more forms are in an unopened state, generating a single user interface and displaying current usage permission states of the selected role with respect to each of the approval nodes of the one or more forms to be approved, wherein all usage permissions associated with each of the approval nodes are displayed, and the usage permissions are selectable with respect to the selected role, the current usage permission states being configured as selected or unselected; and granting or updating by an authorization operator an usage permission of one or more of the approval nodes to the selected role;

wherein said selected role is independent which is not a group or class, and during a same period, one role is configured to be related to a user only, while the user is configured to be related to the one role or more roles, the user is configured to obtain the usage permission of the related one role or more roles.

6. The method according to claim 5, further comprises: authorizing the selected role viewing and/or modification permissions of a form field and/or a filed value of a form corresponding to an approval process in which the approval node is located.

7. The method according to claim 5, wherein said user comprises an employee.

8. The method according to claim 7, wherein when said user is transferred from a post, the user's relation to an original role is canceled, and the user is configured to be related to a new role.

9. The method according to claim 5, wherein said user is a department supervisor.

10. The method according to claim 9, further comprising: authorizing the department supervisor viewing and/or modification permissions of a form field and/or field value of a form corresponding to an approval process in which the approval node is located.

* * * * *